United States Patent
Dorlars et al.

[15] 3,666,758
[45] May 30, 1972

[54] PROCESS FOR THE PRODUCTION OF 2-ARYL-V-TRIAZOLES

[72] Inventors: Alfons Dorlars; Otto Neuner, both of Leverkusen, Germany

[73] Assignee: Farbenfabriken Bayer Aktiengesellschaft, Leverkusen, Germany

[22] Filed: Aug. 14, 1968

[21] Appl. No.: 752,491

[30] Foreign Application Priority Data

Aug. 23, 1967 Germany ............................. F 53 312

[52] U.S. Cl. ................ 260/240 C, 260/240 CA, 260/308 A, 260/471 R, 260/508, 260/566 A, 260/566 AE

[51] Int. Cl. ....................................................... C07d 55/02

[58] Field of Search ..................... 260/240 C, 240 CA, 308 A

[56] References Cited

FOREIGN PATENTS OR APPLICATIONS 1,376,876  9/1964  France ................................. 260/308

Primary Examiner—Alton D. Rollins
Attorney—Plumley & Tyner

[57] ABSTRACT

2-Aryl-v-triazoles are prepared by condensation of alpha-oximino-aryl-hydrazones or their O-acyl compounds at temperatures of about 100° to 210° C. in urea. The compounds are useful as dyestuff intermediates and as optical brighteners.

3 Claims, No Drawings

PROCESS FOR THE PRODUCTION OF 2-ARYL-V-TRIAZOLES

It is already known to prepare 2-aryl-v-triazoles by ring closure of O-acylated α-oximino-hydrazones (cf. e.g. Chemical Reviews, volume 46, 1950, pages 1–68) and H. von Pechmann, Justus Liebigs Annalen der Chemie, volume 262, 1891, pages 269–271 and pages 302–307). According to this process, aryl hydrazines of the general formula

    (I)

in which Ar stands for an aryl group, and X represents a hydrogen atom or an alkyl group,
are condensed with α-oximino-ketones of the formula

    (II)

in which R' stands for an alkyl or aryl radical, and R" represents hydrogen, an alkyl or an aryl group,
to give α-oximino-hydrazones of the formula

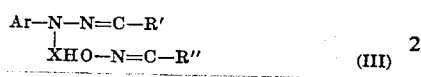    (III)

subsequently transformed with acylating agents into the α-acyloximino-hydrazones of the formula

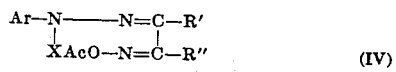    (IV)

and cyclized by thermal treatment, preferably in the presence of bases, acids or water, to give 2-aryl-v-triazoles of the formula

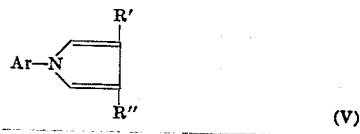    (V)

in which Ar as well as R' and R" have the same meaning as above.

Starting from α-oximino-aryl-hydrazones of the formula (III) in which X stands for a hydrogen atom, the corresponding triazoles of the formula (V) are obtained in yields of at most 50 percent of theory, referred to the compounds of the formula (III) used. Only in a few cases some starting material can be recovered; by far the greatest part of the oximino-hydrazone, which was not cyclized to give the triazole, suffers various irreversible transformations which result in secondary products which contaminate the triazole formed. Thus, for example, cleavages of the oximino-hydrazones may take place, according to the so-called abnormal Beckmann reaction which result in acyl-hydrazines and -nitriles, and in some cases regular Beckmann-rearrangements of the oxime group can be observed. Finally, disproportionations of the α-oximino-hydrazones may occur resulting in osazones and dioximes. Type and extension of these secondary reactions which strongly impair the triazole yield, largely depend, besides on the reaction conditions, upon the type of the substituents and the configuration of the oximino-hydrazones.

However, triazole yields up to about 80 percent of theory are obtained by the above-mentioned process from α-oximino-arylmethyl-hydrazones (III: X = CH$_3$), but α-oximino-arylmethyl-hydrazones can hardly be taken into consideration as technical intermediate products for the synthesis of triazoles because of the difficulty of obtaining the arylmethyl-hydrazines required as starting products.

2-Aryl-v-triazoles of the general formula (V) in which R' stands for a nitro group, and R" for hydrogen can be obtained in yields of about 40–80 percent of theory, according to the process described in German Published Patent Specification No. 1,168,437, by the reaction of acid anhydrides or acid chlorides in an alkaline medium with the corresponding α-oximino-nitro-aryl-hydrazones which are obtainable by the reaction of aromatic diazo compounds with nitroacetaldoxime. However, the process mentioned cannot be used for the preparation of 2-aryl-v-triazoles of the general formula (V) in which R" has other meanings than hydrogen.

A generally applicable process for the production of 2-aryl-v-triazoles of the general formula

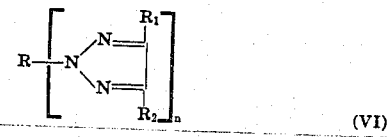    (VI)

in which R stands for an optionally substituted aryl radical, R$_1$ for an optionally substituted alkyl or aryl radical, or for the nitro group, and R$_2$ stands for hydrogen, for an optionally substituted alkyl or aryl radical, and n is the number 1 or 2,
has now been found.

The process according to the invention consists in that α-oximino-aryl-hydrazones of the formula

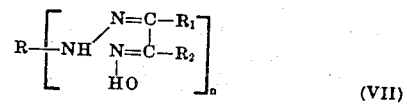    (VII)

in which R stands for an optionally substituted aryl radical, R$_1$ represents an optionally substituted alkyl or aryl radical or the nitro group, and R$_2$ stands for hydrogen or for an optionally substituted alkyl or aryl radical, and n is the number 1 or 2,
or their O-acyl compounds are heated in urea to temperatures of about 100°–210° C.

Suitable acyl derivatives are, for example, alkyl-carbonyl, arylcarbonyl and aminocarbonyl derivatives, particularly the acetyl and benzoyl derivatives.

α-Oximino-aryl-hydrazones of the formula (VII) suitable for the process according to the invention are especially those in which the radicals R, R$_1$ and R$_2$ have the meanings stated in the following:

R: radicals of the benzene and naphthalene series which may contain further substituents, for example, hydroxy groups, nitro groups, cyano groups, halogen atoms, such as fluorine, chlorine or bromine; alkyl groups, especially those with one to four carbons atoms, which may contain further substituents; alkoxy groups, especially those with one to four carbon atoms, which may contain further substituents; sulphonic acid groups, carboxylic acid groups, sulphonic acid alkyl ester groups, especially those with one to four carbon atoms in the alkyl group; carboxylic acid alkyl ester groups, especially those with one to four carbon atoms in the alkyl group; sulphonic acid amide groups, carboxylic acid amide groups, alkylsulphone groups or arylsulphone groups. Suitable radicals of this type are particularly phenyl radicals, diphenyl radicals, diphenyl-methane radicals, diphenyl-ethane radicals, stilbene radicals, tolan radicals and naphthalene radicals with the afore-mentioned substituents.

R$_1$: alkyl radicals, especially those with one to four carbon atoms, which may contain further substituents, for example, hydroxy groups, halogen atoms, such as fluorine, chlorine or bromine; carboxylic acid groups or alkoxy groups, especially those with one to four carbon atoms; optionally substituted phenyl and naphthyl radicals in which as substituents there may be considered, for example, alkyl groups with one to four carbon atoms, alkoxy groups with one to four carbon atoms, halogen atoms, such as fluorine, chlorine or bromine, carboxylic acid groups, carboxylic acid ester groups, especially those with one to four carbon atoms in the alkyl group, as well as carboxylic acid amide groups.

$R_2$: hydrogen, and also the alkyl or aryl radicals mentioned for $R_1$.

The process according to the invention can be carried out in various ways. It is advantageous to introduce the oximino-hydrazones of the formula (VII) or the corresponding acyl derivatives into melted urea, while stirring, at temperatures of about 100°–210° C, preferably at about 120°–175° C, keeping the melt at the aforesaid temperatures until the reaction is completed. Mixtures of solid urea and oximino-hydrazones of the formula (VII) can obviously also be converted into the triazoles by heating and the reaction can also be carried out in a continuous manner. The resultant triazoles of the formula (VI) can readily be separated from the reaction mixture by treatment with water, an addition of acids, alkalis or neutral salts possibly being an advantage. The reaction takes place with the elimination of carbon dioxide, ammonia and water. It is expedient to determine the amount of urea required for each reaction and the optimum reaction temperature by preliminary experiments. Dependent upon the constitution and solubility of the oximino-hydrazone or of the the corresponding acyl derivatives, about the two- to twenty-fold amount by weight of urea is required. In some cases, the addition of solubilizing substances can have a favorable effect on the triazole yield. Suitable solvents of this type are, for example, formamide, acetamide, dimethylformamide, dimethylacetamide, tetramethyl urea, dimethylsulphoxide, diethanolamine, triethanolamine or acetic acid. It is not necessary for carrying out the reaction to operate in an anhydrous medium. In place of the dry oximino-hydrazones, moist products may be used with the same success, such as are obtained, for example, in the condensation of hydrazines with oximino-ketones or coupling of diazo compounds of aromatic amines with nitroacetaldoxime.

The oximino-hydrazones or their acyl derivatives used as starting products are, at least partly, known. Their production is also carried out according to known methods. Thus, oximino-hydrazones of the formula (VII) in which $R_1$ stands for an optionally substituted alkyl or aryl radical, and $R_2$ represents hydrogen or an optionally substituted alkyl or aryl radical, can be obtained by condensing corresponding aryl-hydrazines with α-oximino-ketones of the formula

(VIII)

whilst α-oximino-aryl-hydrazones of the formula (VII) in which $R_1$ stands for the nitro group, and $R_2$ for hydrogen, are obtained by coupling diazo compounds of arylamines with nitroacetaldoxime.

Aryl-hydrazines suitable for the production of the α-oximino-aryl-hydrazones of the formula (VII) are the following, for example, phenylhydrazine, o-, m- and p-tolyl-hydrazine, o-, m- and p-fluorophenylhydrazine, o-, m- and p-chlorophenyl-hydrazine, 2,4- and 2,5-dichlorophenylhydrazine, 2-methyl-5-chlorophenylhydrazine, 3-chloro-4-methoxyphenyl-hydrazine, o-, m- and p-anisylhydrazine, 4-ethoxy- and 4-benzyloxyphenylhydrazine, 2-, 3- and 4-nitrophenylhydrazine, phenylhydrazine-2-, -3- and -4-sulphonic acid, phenyl-hydrazine-2-, -3- and -4-sulphonic acid amide, phenyl-hydrazine-2-, -3- and -4-methylsulphone, phenylhydrazine-2-, -3- and -4-ethylsulphone, 2-chlorophenylhydrazine-4-sulphonic acid, 4-chlorophenylhydrazine-3-sulphonic acid, 2-hydroxy-3-carboxy-phenylhydrazine-5-sulphonic acid, 2-, 3- and 4-hydrazinobenzoic acid, 3- and 4-hydrazinobenzoic acid ethyl ester, 3-hydrazinophthalimide, 4-hydrazinophenyl acetic acid, 3- and 4-hydrazinocinnamic acid, 4-methylphenyl-hydrazine-3-sulphonic acid, 4-hydrazinodiphenyl-4'-sulphonic acid, 4,4'-dihydrazinodiphenyl, 4,4'-dihydrazinodiphenyl-2,2'-disulphonic acid, 4,4'-dihydrazino-diphenylethane-2,2'-disulphonic acid, 4-hydrazinostilbene, 4-hydrazinostilbene-2-sulphonic acid, 4-hydrazino-4'-chlorostil-bene-2-sulphonic acid, 4,4'-dihydrazino-stilbene, 4-hydrazino-4-nitrostilbene-2,2'-disulphonic acid, 4,4'-dihydrazinostilbene-2,2'-disulphonic acid, 4,4'-dihydrazinostilbene-2-sulphonic acid, 4,4'-dihydrazinotolan-2,2'-disulphonic acid, 3,8-dihydrazinodibenzothiophene-4,7-disulphonic acid, 1- and 2-naphthylhydrazine, 1-naphthyl-hydrazine-5-sulphonic acid, 2-naphthylhydrazine-4- and -6-sulphonic acid, 2-naphthylhydrazine-4,8-disulphonic acid, 2-hydrazino-5-hydroxynaphthalene-7-sulphonic acid.

Suitable α-oximino-ketones of the formula (VIII) are the following, for example: oximinoacetone, diacetylmonoxime, 1-oximinobutanone-(2), 1-oximinopentanone-(2), 2-oximinopentanone-(3), 3-oximino-pentanone-(2), 3-oximino-4-methylpentanone-(2), 1-oximinohexanone-(2), 3-oximinohexanone-(2), 3-oximino-heptanone-(4), oximinoacetophenone, p-fluoro-, p-chloro- and p-bromo-oximinoacetophenone, p-methyl-, p-ethyl-, p-methoxy- and p-ethoxy-oximino-acetophenone, 2,4-dimethyl- and 2,5-dimethyl-oximino-acetophenone, oximinopropiophenone, p-fluoro-, p-chloro- and p-bromo-oximinopropiophenone, p-methyl- and p-methoxy-oximinopropiophenone, 1-oximino-1-phenylacetone, 1-oximino-1-o-, -m- and -p-anisylacetone, 1-oximino-1-o-, -m- and -p-tolylacetone, 1-oximino-1-(o-, -m- and -p-chlorophenyl)-acetone, 1-(4- and 3-carboxymethyl-phenyl)-1-oximinoacetone, γ-benzoyl-γ-oximino-butyric acid, oximinobutyrophenone, oximinovalerophenone, benzil-monoxime, 4,4'-dichloro-benzilmonoxime, tolilmonoxime, oximino-1-acetonaphthone, oximino-2-acetonaphthone.

Instead of the α-oximino-aryl-hydrazones obtainable from the above-mentioned components, their O-acyl derivatives can also be used. The acetyl, benzoyl and carbamoyl derivatives may here be mentioned in particular.

In comparison with the previously known methods for the synthesis of 2-aryl-v-triazoles of the formula (VI), the process according to the invention has the advantage of being more generally applicable and of yielding, at the same time, products of a greater purity and mostly in substantially higher yields.

Some of the 2-aryl-v-triazoles of the formula (VI) which can be obtained according to the invention are valuable intermediates for the production of ultra-violet absorption agents, optical brightening agents and dyestuffs, some are themselves valuable ultra-violet absorption agents or optical brightening agents.

The degrees given in the following Examples are degrees centigrade.

EXAMPLE 1

940 g (5 mol) phenylhydrazine-3-sulphonic acid are admixed in 2 liters water at about 40°, while stirring, with a sufficient amount of a 44 percent sodium hydroxide solution that the mixture has a pH value of 4.5–5. (About 300–305 ml are used). A solution of 849 g (5.2 mol) oximinopropiophenone in 2 liters methanol is then added, and the reaction mixture stirred for 4 hours at 65° and at a pH of 4.5–5. A further small quantity of a sodium hydroxide solution has to be added dropwise in order to maintain the pH value. Thereafter, aryl-hydrazine can no longer be detected, the methanol is subsequently distilled off at about 65° under reduced pressure, and part of the reaction product slowly crystallizes out. The precipitation is completed by the addition of sodium chloride. After cooling, the precipitated reaction product is sharply filtered off with suction. 2,410 g of a pale yellowish, salt-containing and moist filter paste is obtained which contains 1,670 g sodium salt of the α-oximinopropiophenone-(3-sulphophenyl)-hydrazone and can be further used in the moist state. The yield amounts to 94 percent of theory.

1,540 g (3 mol) of the still moist 69.5 percent sodium salt of the α-oximinopropionphenone-(3-sulphophenyl)-hydrazone are introduced at 135° in portions, while stirring, into 3.8 kg of melted urea. Ammonia escapes in the process and water distils off which is collected in a receiver. As soon as all oximinohydrazone is introduced, the mixture is heated to 160° while, besides ammonia and water, also carbon dioxide escapes, and stirring is continued at the same temperature for 40 minutes. The reaction mixture is subsequently allowed to cool to 130°, and pressed into a solution of 600 g sodium chloride and 300 ml of a 44 percent sodium hydroxide solution in 6 liters water. The reaction product separates in the form of a bright crystalline precipitate which, after cooling to room temperature, is filtered off with suction, washed with a cold dilute sodium chloride solution and dried. 906 g of a bright slightly yellowish product with a content of 830 g (92 percent of the sodium salt of 2-(3-sulphophenyl)-4-phenyl-5-methyl-v-triazole are obtained. The yield amounts to 82 percent of theory.

In an analogous manner and with similar high yields there are obtained the sodium salt of 2-(3-sulphophenyl)-4-phenyl-v-triazole (starting from phenylhydrazine-3-sulphonic acid and oximinoacetophenone), the sodium salt of 2-(3-sulphophenyl)- 4,5-diphenyl-v-triazole (from phenylhydrazine-3-sulphonic acid and benzilmonoxime), the sodium salt of 2-(3-sulphophenyl)-4-p-tolyl- and -p-anisyl-v-triazole (from phenylhydrazine- 3-sulphonic acid and p-methyl- or p-methoxy-oximinoacetophenone), the sodium salt of 2-(4-sulphophenyl)-4-phenyl-v-triazole (from phenylhydrazine-4-sulphonic acid and oximinoacetophenone), the sodium salt of 2-(4-methyl-3-sulphophenyl)-4-phenyl-v-triazole (from p-tolylhydrazine-m-sulphonic acid and oximinoacetophenone), the sodium salt of 1-[4,5-dimethyl-v-triazolyl-(2)]-naphthalene-4-sulphonic acid (from 1-hydrazinonaphthalene-4-sulphonic acid and diacetylmonoxime), the sodium salt of 2-[4,5-dimethyl-v-triazolyl-(2)]-naphthalene-4,8-disulphonic acid (from 2-hydrazinonaphthalene-4,8-disulphonic acid and diacetylmonoxime).

EXAMPLE 2

403 g (1 mol) 4,4'-dihydrazino-diphenyl-ethane-2,2'-disulphonic acid are stirred at 50° in 2 liters water and mixed with a 44 percent sodium hydroxide solution until the mixture has a pH value of 6.2–6.5 (about 120–125 ml are used). A solution of 313 g (2.1 mol) oximinoacetophenone in 2 liters methanol is then allowed to run in, and the mixture is stirred for 1½ hours at a pH of 5–5.5 and at 70–72 °. After this time the condensation is completed and the methanol is distilled off from the reaction mixture under reduced pressure. The separation of the partly precipitated yellow bis-ox-iminohydrazone is completed by the addition of 1.5 liters of a saturated sodium chloride solution, and the precipitate is filtered off with suction after cooling to room temperature. 1,185 g of a moist paste are obtained which contains 650 g of the disodium salt of 4,4'-bis-(α-oximinoacetophenone-hydrazono)-diphenyl-ethane-2,2'-disulphonic acid of the formula

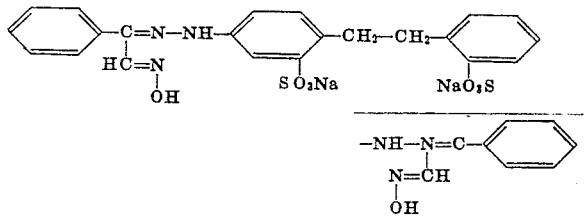

The yield amounts to 92 percent of theory.

1,185 g (0.92 mol) of the still moist bis-α-ox-iminohydrazone are then introduced, while stirring, into 2.2 kg of melted urea at 130°–135°. The escaping ammonia and water are collected in a receiver. The mixture is subsequently stirred at 160°–165° for 1½ hours and a solution of 350 ml of a 44 percent sodium hydroxide solution and, after cooling to 130°, 200 g sodium chloride in 4 liters water are subsequently allowed to run in slowly. After cooling to 40°, the precipitated crude bis-triazole is filtered off with suction and purified by redissolving from 5 liters of hot water with the addition of active charcoal; the clear filtrate is subsequently mixed with a further 180 g sodium chloride, while hot. The precipitated crystalline reaction product is subsequently sharply filtered off with suction at room temperature, washed with a dilute sodium chloride solution and dried. 461 g of a pale yellow powder is obtained which contains 430 g of the sodium salt of 4,4'-bis-[-phenyl-v- triazoyl-(2)]-diphenyl-ethane-2,2'-disulphonic acid of the formula

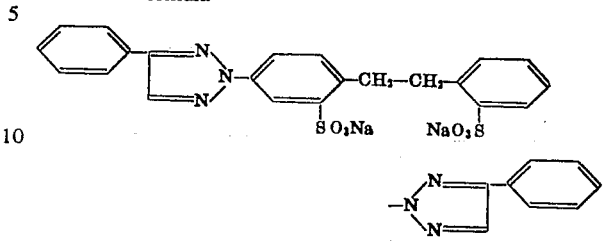

Yield 69.5 percent of theory; (i.e. 83 percent per triazole ring closure).

In a corresponding manner and with similar high yields there are obtained the disodium salt of 4,4'-bis-[4-phenyl-v-triazolyl-(2)]-stilbene-2,2'-disulphonic acid, starting from 4,4'-dihydrazino-stilbene-2,2'-disulphonic acid and ox-iminoacetophenone, the disodium salt of 4,4'-bis-[4,5-diphenyl-v-triazoyl-(2)]-stilbene-2,2'-disulphonic acid (from 4,4'-dihydrazinostilbene-2,2'-disulphonic acid and benzilmonoxime), and the disodium salt of 4,4'-bis-[4-methyl-v-triazolyl-(2)]-stilbene-2,2'-disulphonic acid (from 4,4'-dihydrazinostilbene-2,2'-disulphonic acid and oximinoacetone).

EXAMPLE 3

185 g (1 mol) 4-hydrazino-benzoic acid hydrochloride are suspended in 1 liter of 50 percent aqueous methanol. 10 g sodium acetate are added and the pH value of the mixture is adjusted to 4.6 to 4.8 by the addition of a sodium hydroxide solution 165 g (1.1 mol) oximinoacetophenone are subsequently introduced at 65°–70°. The reaction mixture is stirred at this temperature until a free hydrazino compound is no longer detected, this takes about 2 hours. The bulk of the methanol is subsequently distilled off under reduced pressure, the mixture is cooled to room temperature, the precipitated oximino-hydrazone is filtered off with suction, washed with water and dried. 254 g (95 percent of theory) are obtained.

254 g (0.95 mol) of the oximino-hydrazone thus obtained are introduced at 135°–140°, while stirring, into 1.2 kg of melted urea. The mixture is stirred at 165° for 2½ hours, (the vigorous gas evolution has then finished), and at 175° for a further hour. The mixture is finally cooled to 130°, mixed with a solution of 10 g sodium dithionite in 2.5 liters of a 2N sodium hydroxide solution and, after a further brief stirring, with 300 g of sodium chloride. The precipitated sodium salt is filtered off with suction at 5060° and mixed by stirring in 2 liters of hot water. The free triazolyl-benzoic acid is precipitated by the addition of hydrochloric acid, filtered off with suction, washed with water and dried. 220 g (83 percent of theory) 4-[4-phenyl-v-triazolyl-(2)]-benzoic acid are obtained which is sufficiently pure for most preparative purposes. It can be obtained in an analytically pure state by clarification of its aqueous alkaline solution with charcoal and precipitation with hydrochloric acid. Almost colorless crystals of melting point 270°–270.5° are obtained. In an analogous manner there are obtained from p-hydrazino-benzoic acid hydrochloride and benzilmonoxime: the 4-[4,5-diphenyl-v-triazolyl-(2)]-benzoic acid in the form of almost colorless crystals of melting point 267°. From p-hydrazino-benzoic acid hydrochloride and ox-iminopropiophenone there is formed in corresponding manner a mixture of about 2/3 4-[4-phenyl-5-methyl-v-triazolyl-(2)]-benzoic acid of melting point 244.5°–245.5° and ⅓ 4-[4-phenyl-5-methyl-v-triazolyl-(2)]-benzamide of melting point 224°–226° which can easily be hydrolized to give the first mentioned benzoic acid.

The 3-[4-phenyl-v-triazolyl-(2)]-benzoic acid can be prepared in the same manner from m-hydrazinobenzoic acid and oximinoacetophenone, melting point 225.5°–227°.

EXAMPLE 4

163 g (1 mol) 4-hydrazinophenyl-acetic acid are mixed at 65°, while stirring, in 1.2 liters 50 percent aqueous methanol with 165 g (1.1 mol) oximinoacetophenone. The pH value of the mixture is kept at 4.6 to 4.8, by the addition of a little acetic acid if necessary. As soon as hydrazine can no longer be detected, the bulk of the methanol is distilled off under reduced pressure, and the remaining solution is allowed to cool, while stirring. The initially oily precipitate of the resultant oximino-hydrazone crystallizes after a short time; the orange-colored product is filtered off with suction. There are obtained about 340 g of a still moist suction-paste which is introduced without further purification at 135°–140° within a half hour, while stirring, into 600 g of molten urea. The melt is slowly heated to 165°, stirred at this temperature for 2½ hours, and subsequently kept at 175° for a further half hour. It is then allowed to cool a little, 1 liter of a 2N sodium hydroxide solution is added dropwise and, after the addition of 2 g sodium dithionite, stirred at about 80° for a further half hour. The product is then salted out with 100 g sodium chloride, the resultant 4-[4-phenyl-v-triazolyl-(2)]-phenylacetamide is filtered off with suction, washed and dried. Yield: 209 g or 75.3 percent of theory, referred to the hydrazinophenyl-acetic acid used. Yellowish white crystals of melting point (methyl glycol): 227°–229°.

209 g (0.75 mol) phenyltriazolyl-phenylacetamide are heated at 100° for 15 minutes in a mixture of 1.2 liters water and 1.3 liters concentrated sulphuric acid. The mixture is then cooled to 20° and a solution of 160 g sodium nitrite in 400 ml water is added dropwise. It is subsequently stirred at 80°–90° for a further 3 hours, then cooled to room temperature and the crystalline precipitate is filtered off with suction. The crude product thus obtained is purified by dissolving it in 4 liters of a very dilute sodium hydroxide solution, clarification of the filtrate with active charcoal and precipitation with concentrated hydrochloric acid. In this way there are obtained 124 g (60 percent of theory) of almost colorless crystalline 4-[4-phenyl-v-triazolyl-(2)]-phenyl-acetic acid of melting point 169°.

EXAMPLE 5

111 g (0.5 mol) of dry oximinoacetone-p-nitrophenyl-hydrazone are introduced at 140°, while stirring, into 1.65 kg of molten urea. The mixture is subsequently stirred at 170°–175° for 2 hours while ammonia and carbon dioxide escape. It is finally cooled to about 100° and 850 ml of a 2N sodium hydroxide solution are added dropwise into the reaction mixture. The triazole derivative formed precipitates in the form of yellow crystals which, after cooling to room temperature, are filtered off with suction, washed with water and dried. 87 g (85 percent of theory) 2-(4-nitrophenyl)-4-methyl-v-triazole of the formula

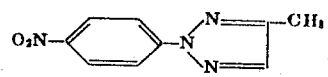

of melting point 130°–132° are obtained.

EXAMPLE 6

104 g (0.5 mol) nitroglyoxaloxime-phenyl-hydrazone (prepared by coupling benzene-diazonium chloride with nitroacetaldoxime) are introduced, while stirring, into a mixture heated to 140° of 800 g urea and 120 g glacial acetic acid and stirred at 140°–150° for 15 minutes. 600 ml water are subsequently slowly run in and, after cooling the mixture, the precipitated yellow triazole is filtered off with suction, washed with water and dried. 81 g (86 percent of theory) of the triazole of the formula

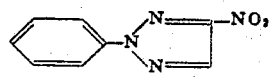

of melting point 123°–125° are obtained.

EXAMPLE 7

44.5 g (0.2 mol) nitroglyoxaloxime-p-tolyl-hydrazone (prepared by coupling diazotised p-toluidine with nitroacetaldoxime) are intimately mixed with 450 g urea. This mixture is heated to 160° within 40 minutes and kept at this temperature for 10 minutes. The resultant clear melt is subsequently cooled to 100° and mixed, while stirring, with 300 ml of a 2N sodium hydroxide solution. The resultant 2-p-tolyl-4-nitro-v-triazole precipitates in the form of pale brown crystals which are filtered off with suction, washed with water and dried. Melting point 112°–114° C. The yield amounts to 34.5 g (85 percent of theory).

We claim:

1. In the process of preparation of 2-aryl-1,2,3-triazoles comprising reacting by heating an α-oximino hydrazone or an α-acyl oximino hydrazone, the improvement comprising carrying out the reaction at 100°–210°C. in urea.

2. Process according to claim 1, characterized in that the reaction medium additionally contains a solvent for reactants.

3. Process according to claim 1, characterized in that the reaction medium additionally contains water.

* * * * *